US012736434B2

(12) United States Patent
Scherer et al.

(10) Patent No.: US 12,736,434 B2
(45) Date of Patent: Sep. 15, 2026

(54) LEAK-DETECTION SYSTEM AND METHODS FOR LEAK DETECTION

(71) Applicant: California Institute of Technology, Pasadena, CA (US)

(72) Inventors: Axel Scherer, Barnard, VT (US); Taeyoon Jeon, Pasadena, CA (US); Changsoon Choi, Pasadena, CA (US); Peter A Petillo, Lawrence, KS (US); Jack Jewell, Boulder, CO (US); John Richard Ordonez-Varela, Lescar (FR)

(73) Assignees: California Institute of Technology, Pasadena, CA (US); TotalEnergies E&P Research & Technology USA, Inc., Courbevoie (FR)

( * ) Notice: Subject to any disclaimer, the term of this patent is extended or adjusted under 35 U.S.C. 154(b) by 105 days.

(21) Appl. No.: 18/660,616

(22) Filed: May 10, 2024

(65) Prior Publication Data

US 2024/0377279 A1 Nov. 14, 2024

Related U.S. Application Data

(60) Provisional application No. 63/465,475, filed on May 10, 2023.

(51) Int. Cl.

*G01M 3/38* (2006.01)
*G01N 21/3504* (2014.01)
*G06V 10/88* (2022.01)

(52) U.S. Cl.

CPC ............... *G01M 3/38* (2013.01); *G06V 10/88* (2022.01); *G01N 21/3504* (2013.01)

(58) Field of Classification Search

CPC ........ G01M 3/38; G01M 3/002; G06V 10/88; G01N 21/3504

See application file for complete search history.

(56) References Cited

U.S. PATENT DOCUMENTS

| | | | |
|---|---|---|---|
| 3,662,171 A | 5/1972 | Brengman et al. | |
| 5,138,485 A * | 8/1992 | Ishida ...................... | G02B 5/20 359/359 |

(Continued)

OTHER PUBLICATIONS

Authorized Officer Karl Rodriquez, International Search Report and Written Opinion received in related PCT Patent Application No. PCT/US2024/028849 mailed on Aug. 28, 2024 and received on Dec. 19, 2024.

*Primary Examiner* — Monica T Taba

(74) *Attorney, Agent, or Firm* — Kaplan Breyer Schwarz, LLP

(57) ABSTRACT

A leak-detection system comprises networked imaging packages including an infrared camera based on microbolometer arrays, one or more filters, and a processor. The processor uses one or more novel processing methods for identifying gas leakages in a monitored facility. In some embodiments, the imaging packages are installed at various locations in the monitored facility. In some other embodiments, the leak-detection system is embodied as a mobile platform, wherein the networked imaging packages are coupled to drones that fly throughout the monitored facility to monitor for gas leakages. The flight path of the cameras may be pre-programmed and may further be alterable in real time. The novel processing technique(s) employed by the leak-detection system disclosed herein involve the use of multiple unique filters that facilitate enhancing the signal-to-noise ratio of captured images; that is, enhancing the contrast of a monitored gas against other objects. The novel processing techniques include one or more of the following: (i) two-image subtraction; (ii) time-resolved imaging; and (iii) multi-filter detection. Additionally, in some embodiments, the imaging packages include a visible (light) camera in addition to an IR camera.

15 Claims, 7 Drawing Sheets

(56) References Cited

U.S. PATENT DOCUMENTS

| | | | | |
|---|---|---|---|---|
| 2008/0251724 | A1* | 10/2008 | Baliga | G01J 3/02 250/338.5 |
| 2016/0156880 | A1* | 6/2016 | Teich | H04N 23/951 348/82 |
| 2018/0191967 | A1* | 7/2018 | Kester | H04N 23/45 |
| 2020/0103881 | A1* | 4/2020 | Halgren, III | G05D 1/0044 |
| 2020/0128196 | A1 | 4/2020 | Kester | |
| 2021/0076006 | A1 | 3/2021 | O'Neill et al. | |
| 2023/0258848 | A1 | 8/2023 | Jeon et al. | |

* cited by examiner 100
101
102-1
102-2
102-3
102-4
104
106
106
106
106

102
320
322
324
326
328
330
332
334

550
556
555
554
553
552
551
Ge
BaF2
Ge
BaF2
Ge
Si

642A
Transmittance (a.u.)
1900
1700
1500
1300
1100
900
700
Wavenumber (cm-1)
642B
Transmittance (a.u.)
1900
1700
1500
1300
1100
900
700
Wavenumber (cm-1)

20
60
100
140

20
60
100
140
20
80
140
200
6250
6200
6150
6100
6050

20
60
100
140
20
80
140
200
40
20
0
-20
-40

LEAK-DETECTION SYSTEM AND METHODS FOR LEAK DETECTION

This case claims priority of U.S. Pat. App. Ser. No. 63/465,475, filed May 10, 2023 and incorporated herein by reference.

FIELD OF THE INVENTION

The present invention relates to leak detection via infrared cameras, and associated methods.

BACKGROUND

Early detection of leaks is essential for the safe operation of pipelines, refineries, and other petrochemical installations. To this end, remote sensing of gas leaks in such facilities has been long practiced.

Historically, remote sensing has been performed via satellite imaging or manual observation using infrared-imaging technology. More recently, mobile platforms, such as drones, rail systems, or autonomous vehicles have been used to move thermal imaging and spectroscopy systems throughout large facilities. These mobile systems provide several benefits, including: automation, elimination of redundant systems, and a significant reduction in the overall cost of leak-detection systems.

The imaging of leaks relies heavily on the combination of filters, infrared cameras, and image processing within various spectral ranges. Indeed, imaging with spectrally filtered infrared cameras has emerged as one of the most versatile and efficient tools available for monitoring leaks, as it is possible to detect, and/or differentiate between leaks of methane, propane, and other organic gases.

Presently, filtered infrared cameras are commonly used for periodic inspection, because spectrally selective cameras are very expensive. Such cameras use semiconductor (InSb) detectors, which require cooling, contributing to their high cost. For instance, methane detectors based on semiconductor cameras can cost upwards of $60,000. Recently, infrared cameras based on microbolometer arrays have become available. These cameras are considerably less expensive than the aforementioned cameras; however, their performance is not on-par with that of the expensive cameras.

SUMMARY

The present invention provides systems and methods for monitoring/detecting gas leaks, such as from petrochemical, petroleum, or other industrial facilities. In accordance with the present teachings, a leak-detection system employing one or more novel processing methods provides a continuous monitoring system. By virtue of these novel processing methods, relatively inexpensive microbolometer-array-based infrared cameras can be used in the system. That is, notwithstanding a lesser nominal performance specification, the enhancements wrought via the novel processing methods disclosed herein elevate the performance of such IR cameras to levels that meet or exceed those of far more expensive IR cameras. Among any other system benefits, the use of lower-cost cameras enables a large number of cameras to be dedicated to a leak-detection system. Such a system is able to provide more expansive coverage of the monitored facility, as well as other benefits, as described further below.

In some embodiments, the leak-detection system includes a plurality of imaging packages, which include networked IR cameras installed at various locations at an industrial facility. In some other embodiments, the leak-detection system is embodied as a mobile platform, wherein the networked imaging packages are coupled, for example, to flight-capable drones, which fly throughout an industrial facility to monitor for gas leakage. The flight path of the cameras may be pre-programmed and may further be alterable in real time.

The novel processing technique(s) employed by the leak-detection system disclosed herein involve the use of multiple unique filters that enhance the quality (e.g., signal-to-noise ratio, contrast, etc.) of captured images. That is, they enhance the image of a gas leak against other objects. The novel processing techniques include one or more of the following: (i) two-image subtraction; (ii) time-resolved imaging; and (iii) multi-filter detection. In illustrative embodiments, processing techniques (i) and (ii) are used to detect leakage of methane gas, and processing technique (iii) is used to detect leakage of a variety of different gases. Moreover, in embodiments of the leak-detection system as a mobile platform, detection is enhanced by an ability to image leaks from various angles. Additionally, in some embodiments, the imaging system includes a visible (light) camera in addition to an IR camera.

Summarizing, a leak-detection system, and methods therefore, as depicted and described, comprises: (i) a server, and (ii) a plurality of imaging packages, wherein each imaging package includes an infrared camera including a microbolometer array and a processor. Embodiments of the leak-detection system, and methods therefore, may further comprise at least one of the following features, in any (non-conflicting) combination, among other features disclosed herein:

- Wherein at least some of the imaging packages include a methane filter that is sensitive (transmissive) to infrared radiation in the range of about 7.7 to 7.8 microns, corresponding to one of the absorption peaks of the IR spectrum of methane, but not sensitive to infrared radiation in the range of about 3.3 microns, which corresponds to another of the absorption peaks of the IR spectrum of methane.
- Wherein at least some of the imaging packages include a methane filter that comprises alternating layers of germanium and barium fluoride.
- Wherein at least some of the imaging packages include a methane filter, as well as a reference filter that is substantially not transmissive to infrared radiation in the range of about 7.7 to 7.8 microns; and a processor that subtracts an image obtained from the reference filter from the image obtained from the methane filter.
- Wherein at least some of the imaging packages include a filter wheel having a methane filter and the reference filter, and a motor that drives the filter wheel to a position one of either the methane filter of the reference filter in front of a lens of the infrared camera, responsive to commands from the processor.
- Wherein at least some of the imaging packages include a visible (light) camera.
- Wherein at least some of the imaging packages include a transceiver, separate from the processor, for communicating with a server.
- Wherein the imaging packages include a power supply for powering elements of the imaging package.
- Wherein the processor transmits information to the server.
- Wherein the server transmits information to the processor.
- Wherein the processor transmits, to the server, information obtained from a visible camera.

Wherein the processor transmits data to the server, and wherein the server uses the data to train an A.I. algorithm.

Wherein at least some of the imaging packages are coupled to a respective flight-capable drone.

Wherein at least some of the flight-capable drones are preprogrammed to monitor a particular location in a facility.

Wherein at least some of the flight-capable drones may be directed via the server to monitor a particular location in the facility.

Wherein the processor may run an A.I. algorithm that is capable of detecting leaks.

Wherein a filter wheel includes a plurality of different filters to monitor a facility for leaks of a plurality of different types of gases.

Wherein the processor is capable of subtracting an image obtained via an infrared camera at a first location at a second time, from an image obtained via the infrared camera at the first location at a first time, providing time-resolved imaging.

Wherein the time resolved imaging can be of filtered image or a non-filtered image.

Wherein images obtained at a first location via an IR camera are obtained at a plurality of angles.

Wherein the server redirects the flight-capable drones from pre-programmed locations to another location based on intelligence concerning a suspected leak at the other location.

DETAILED DESCRIPTION

The following disclosure merely illustrates the principles of the invention. It will thus be appreciated that in light of the disclosure, those skilled in the art will be able to devise various arrangements which, although not explicitly described or shown herein, embody the principles of the invention and are included within its spirit and scope. Furthermore, all examples and conditional language recited herein are principally intended for pedagogical purposes to aid the reader in understanding the principles of the invention and the concepts contributed by the inventor(s) to furthering the art, and are to be construed as being without limitation to specifically recited examples and conditions.

Moreover, all statements herein reciting principles, aspects, and embodiments of the disclosure, as well as specific examples thereof, are intended to encompass both structural and functional equivalents thereof. Additionally, it is intended that such equivalents include both currently known equivalents as well as those developed in the future; that is, any elements developed that perform the same function, regardless of structure.

Thus, for example, it will be appreciated by those skilled in the art that any block diagrams herein represent conceptual views of illustrative circuitry embodying the principles of the disclosure. Similarly, it will be appreciated that any flow charts, flow diagrams, state transition diagrams, pseudo code, and the like represent various processes that may be substantially represented in computer readable medium and so executed by a computer or processor, whether or not such computer or processor is explicitly shown.

Figures 1, 3:
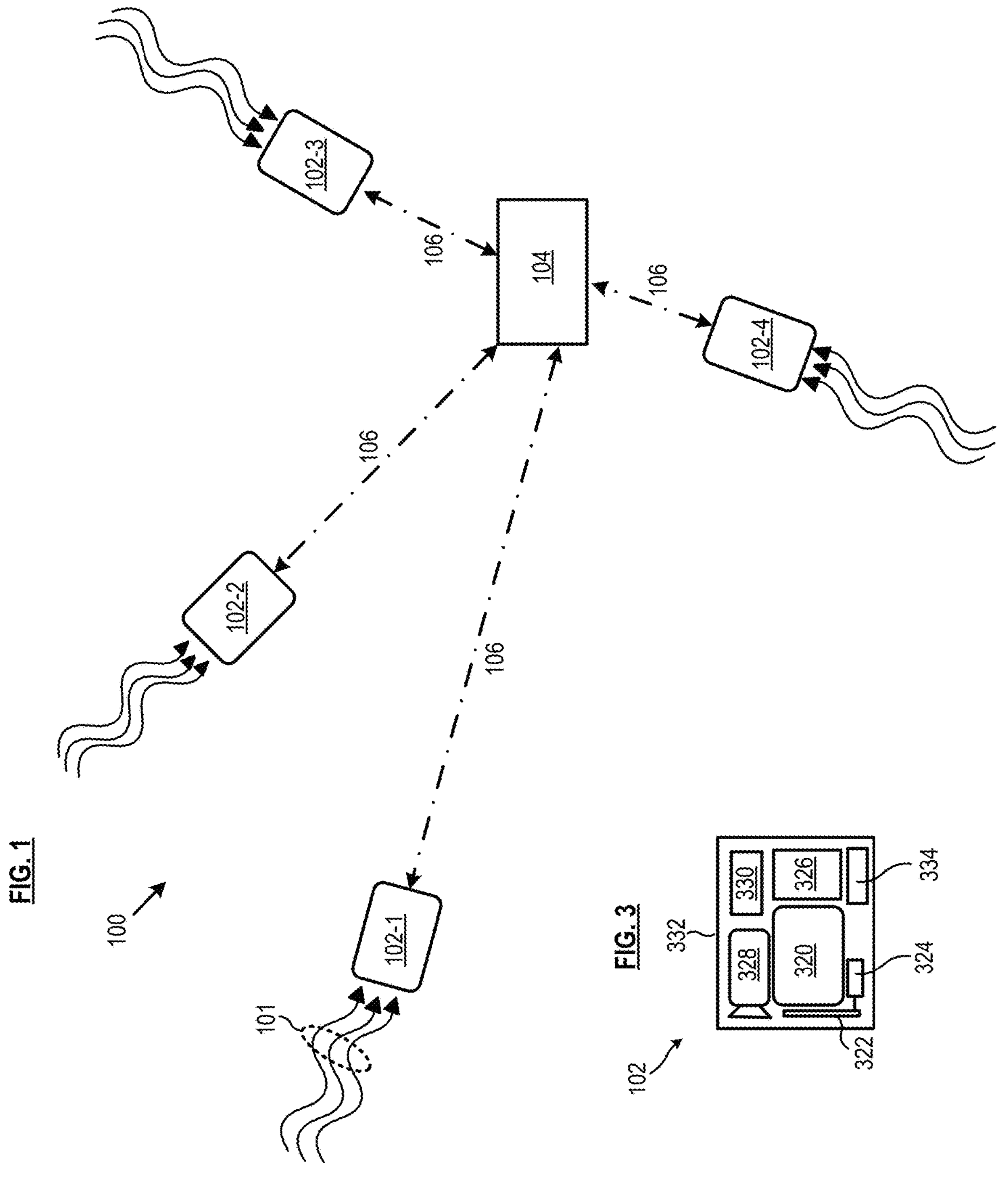
FIG. 1 depicts a leak detection system in accordance with the illustrative embodiment of the present invention.
FIG. 3 depicts an imaging assembly of the leak-detection system of FIG. 1.

FIG. 1 depicts leak-detection system 100 for detecting gas leaks, such as may occur in industrial plants. Leak-detection system 100 include a plurality of imaging packages 102-1, 102-2, and 102-3 (hereinafter collectively or individually, imaging package(s) 102). Imaging packages 102 are capable of imaging mid infrared radiation (IR) 101, and, in some embodiments, also capable of imaging visible light.

In addition to imaging packages 102, leak-detection system 100 includes centralized server 104, with which the imaging packages exchange data/information/commands over communications links 106. Server 104 may be a personal computer (PC), a laptop computer, a tablet computer, or any other computing device. Server 104 typically includes a processor, main memory, storage device, and input/output (I/O) device, which are interconnected in known fashion. Communication links 106 may be supported via Wi-Fi, Bluetooth, or other communications protocols.

System 100 is depicted as having four imaging packages 102; this is for simplicity of illustration. It is to be understood that typically, many more such imaging packages 102 will be included in system 100.

Figures 2A, 2B:
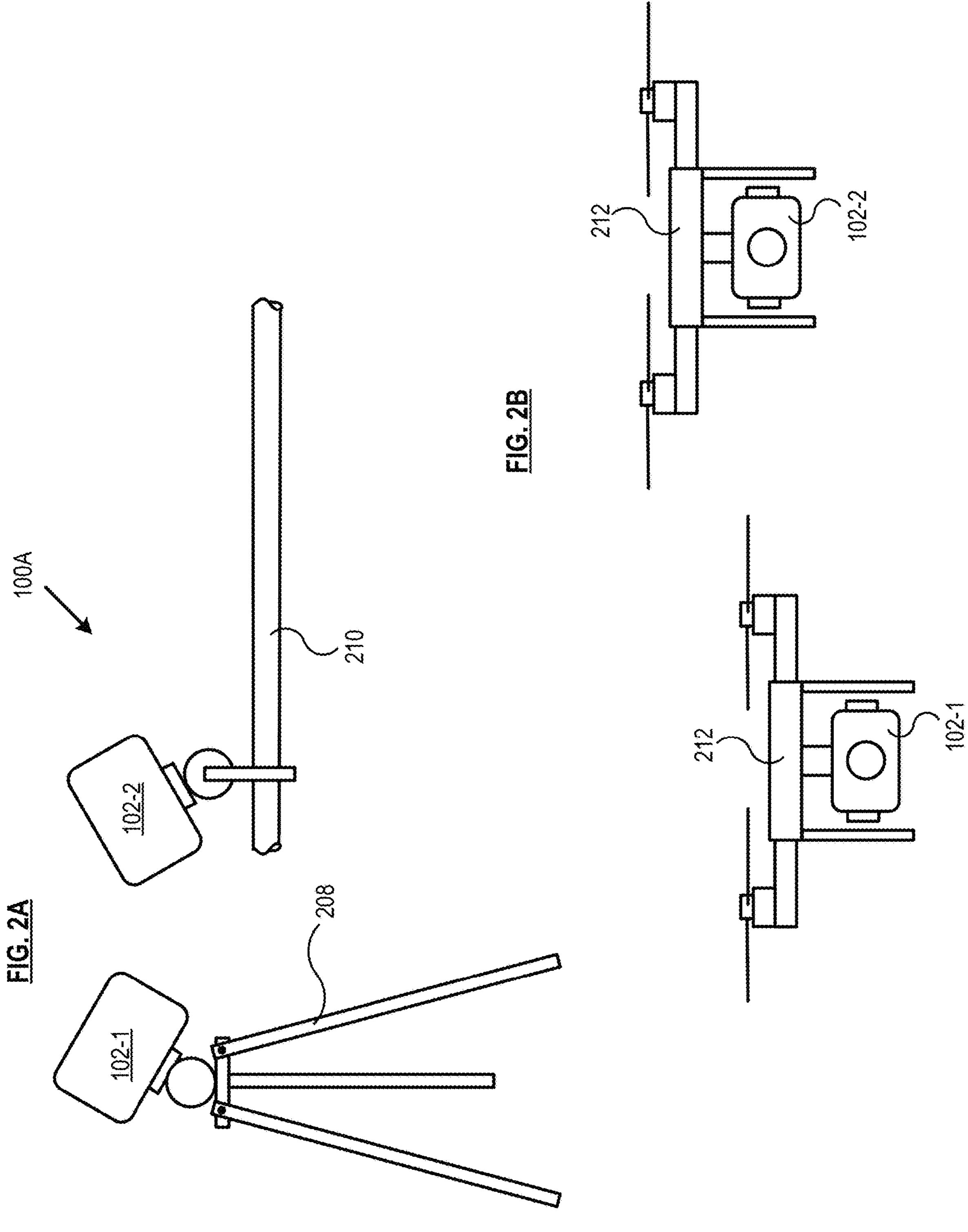
FIG. 2A depicts the leak-detection system of FIG. 1 embodied as a fixed monitoring system.
FIG. 2B depicts the leak-detection system of FIG. 1 embodied as a mobile monitoring system.

Leak-detection system 100 may be configured as fixed monitoring system 200A, as depicted in FIG. 2A, or as mobile monitoring system, as depicted in FIG. 2B. In fixed monitoring system 200A, some of imaging packages 102, such as imaging package 102-1, may be installed on tripod 208 at a desired location for leak monitoring in a facility. Some other of imaging packages 102, such as imaging package 102-2, may be installed on structural supports 210 or other substantially permanent features of the monitored facility itself.

In mobile monitoring system 200B, each imaging package 102 may, for example, be mounted on drone 212. The various drones 212 may be pre-programmed to monitor various specific locations in a facility. Mobile monitoring system 200B offers a number of advantages over fixed monitoring platform 200A. For example, one or more drones 212 can be re-directed to a specific location in real time, such as to investigate a suspected gas leak. Additionally, as described further below, the use of drones 212 can simplify the technology required in each imaging package 102.

FIG. 3 depicts imaging package 102. In the illustrative embodiment, imaging package 102 includes IR camera 320, filter wheel 322, motor 324, processor 326, visible camera 328, power supply 330, housing 332, and optional transceiver 334.

In the illustrative embodiment, each IR camera 320 utilizes a microbolometer array as an IR sensor. Well-known in the art, the microbolometer array functions as an uncooled thermal sensor. When infrared radiation having wavelengths between about 7.5 and 14 microns strike the detector, it heats, resulting in a change in its electrical resistance. This resistance change is measured and processed into temperatures that are used to create an image. Such cameras are commercially available from Seek Thermal, Inc. of Santa Barbara, CA and others.

Filter wheel 322 includes two or more filters that facilitate the signal-processing methods described later herein. In the illustrative embodiment, filter wheel 322 is positioned in front of the lens (not depicted) of IR camera 320. Motor 324 is operatively coupled to filter wheel 322 to move a desired one of the filters of filter wheel 322, per instructions from processor 326, in position in front of the lens of IR camera 320.

Processor 326 is typically a microprocessor, such as a Raspberry Pi brand microprocessor available from the Raspberry Pi Foundation of 37 Hills Rd, Cambridge CB2 1NT, United Kingdom. Processor 326 controls/performs a variety of function required for the operation of imaging package 102. For example, processor 326 is operatively coupled to IR camera 320 and is capable of activating/deactivating the camera. Processor 326 is also operatively coupled to motor 324, and is capable of selecting a desired filter of filter wheel 322. The processor is further capable of performing various signal-processing tasks, such as in conjunction with the methods described later in this specification. Processor 326 is also capable of gathering/organizing data and transmitting it to server 104. Furthermore, processor 326 can receive commands from server 104, such as which filter to select on filter wheel 322, when to activate/deactivate IR camera 320.

In some embodiments, processor 326 includes Wi-Fi and Bluetooth capabilities to support communications 106 between it and server 104. In scenarios in which Wi-Fi or Bluetooth may not be reliable, or if communications over long distances are required, a separate transceiver 334 is required.

It is notable that the use of a mobile platform, such as drones 212, in conjunction with centralized server 104, provides an ability to generate large amounts of data with flexible positioning and timing adjustments. For example, leaks may be imaged at various angles to characterize the geometric nature (plume) of the gas leak. Moreover, a mobile platform provides an ability to position other types of detectors and/or imaging systems at a given location for further analysis of the leak, such as gas concentrations within the plume in near real time. In conjunction with server 104, algorithms may be used to automatically change the performance (e.g., location, timing, etc.) of mobile imaging packages 102 in response to real-time measurements.

In some embodiments, processor 326 include AI-based algorithms for detecting leaks in real time. For training of the algorithm, processor 326 within each imaging package 102 in system 100 transmits real-time video to server 104. Server 104 then trains/updates the algorithm, and updates thereto are then transmitted back to processor 326 within each imaging package 102.

Figure 4:
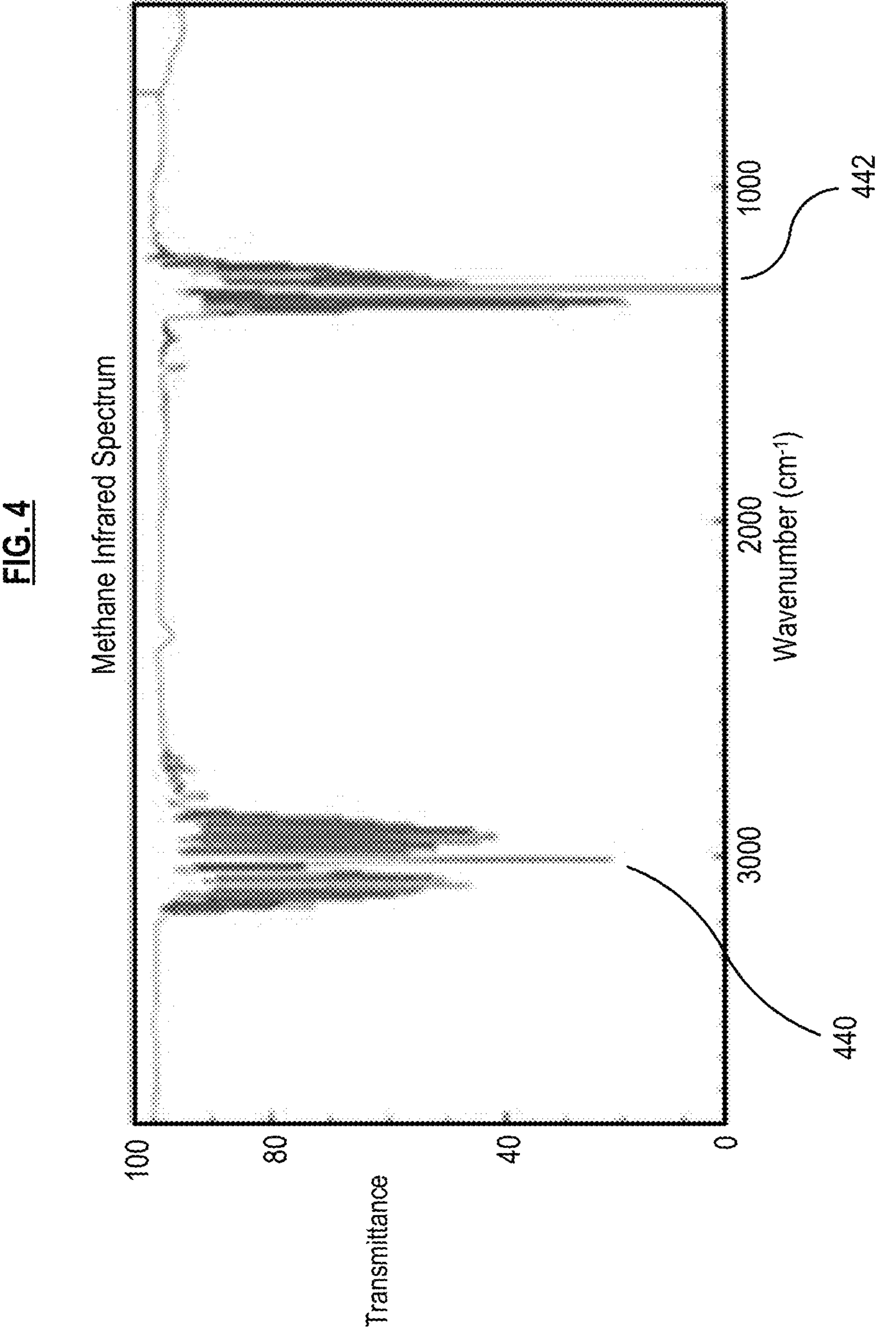
FIG. 4 depicts the infrared transmittance spectrum of methane.

A gas, such as methane, may be characterized by its infrared spectrum. FIG. 4 depicts the infrared spectrum of methane, shown as a plot of transmittance versus wavenumber. Methane exhibits two absorptions regions: region 324 centered at 3.3. microns (wavenumber 3000 $cm^{-1}$) and region 326 at 7.7/7.8 microns (wavenumber 1300 $cm^{-1}$). A typical InSb based camera filters the image selectively at the 3.3-micron absorption band, since the bandgap of such a detector array does not permit imaging above about 5 microns. The present inventors preferred to focus on the 7.7/7.8-micron band, since it is more selective in distinguishing between methane and other relevant species.

Figures 5, 6A, 6B:
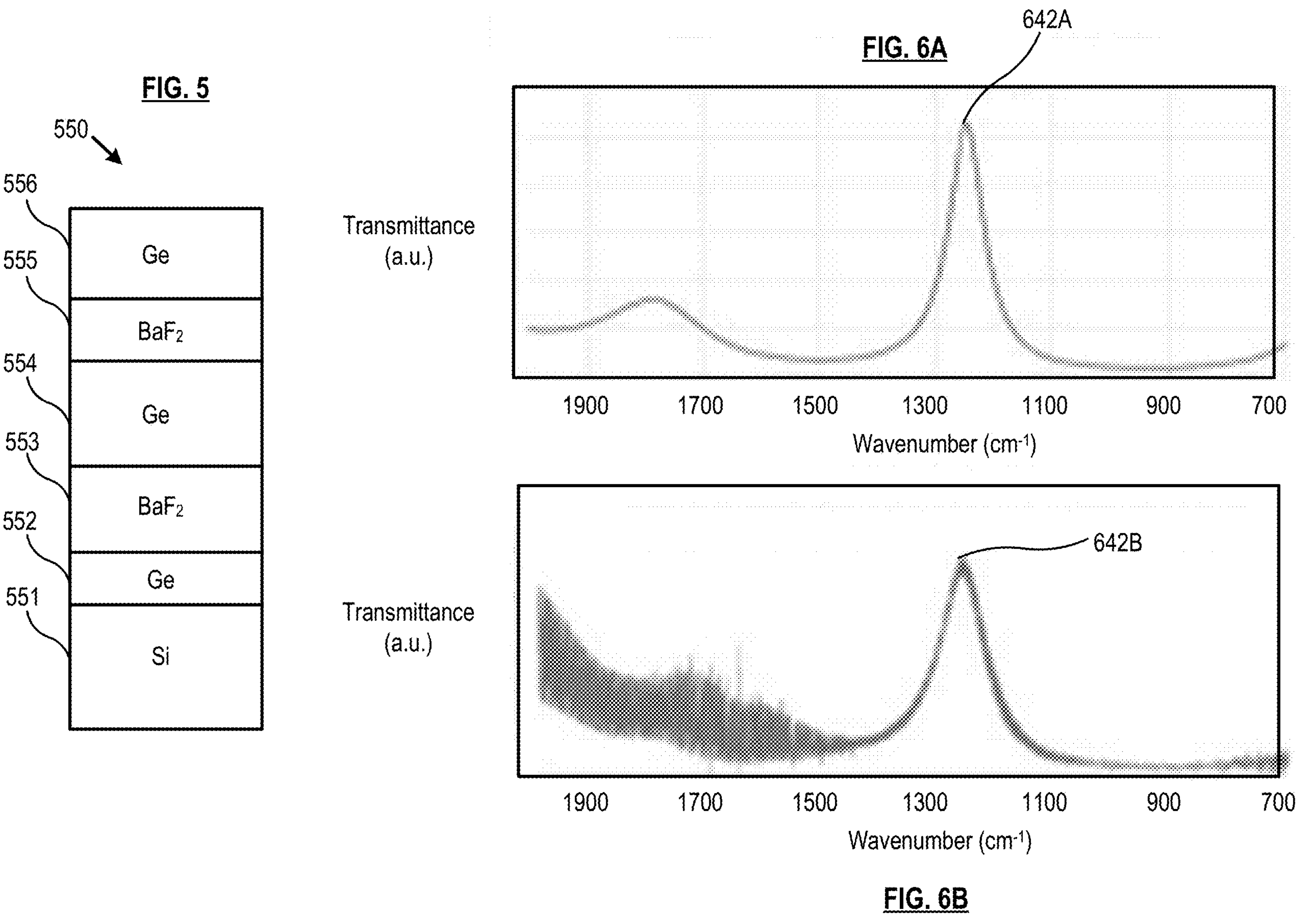
FIG. 5 depicts an optical filter for methane measurement in accordance with the present teachings.
FIG. 6A depicts a simulation of transmittance of the methane filter of FIG. 5.
FIG. 6B depicts the measured transmittance of the methane filter of FIG. 5.

Imaging package 102 must be outfitted with an appropriate filter so that it is sensitive primarily to the wavelength range of the absorption peak of a gas of interest—such as methane. FIG. 5 depicts the structure of optical filter 550 for detecting methane gas.

In the illustrative embodiment, filter 550 comprises germanium (Ge) and barium fluoride ($BaF_2$), which are materials having the highest index contrast and lowest optical loss in the spectral wavelength range from 3 to 20 microns. More particularly, filter 550 comprises silicon wafer 551, layer 552 of germanium (optical distance=0.25), layer 553 of barium fluoride (optical distance=0.25), layer 554 of germanium (optical distance=0.51), layer 555 of barium fluoride (optical distance=0.15), and layer 556 of germanium (optical distance=0.35). As used herein, optical distance, which is a dimensionless number, is given by:

$$\text{Optical distance}=t \times n/\lambda \quad [1]$$

wherein: λ is the target wavelength in microns;

t is the physical thickness of the layer in microns; and n is the refractive index of the layer.

The optical distance of each layer, and the number of layers in the filter may be adjusted based on the bandwidth and peak position of the transmittance peak. Published Patent Application US2023/0258848, incorporated by reference herein, discloses methods for fabricating optical thin-film structures suitable for use as IR wavelength filters in the range of about 1.5 to 20 microns, as are used herein. Other material combinations, such as Ge and ZnS or ZnSe, or silicon/air, or Ge/polyethylene may also be used as an optical filter for methane, but have been found to exhibit inferior optical properties.

FIG. 6A depicts a plot of transmittance versus wavenumber for a simulation of filter 550. The simulation indicates filter 550 provides peak 642A at about 7.8 microns (1280 $cm^{-1}$) with a FWHM value of 500 nanometers to match the methane absorption line. The measured performance of filter 550, as depicted in FIG. 6B, is consistent with the simulation, showing transmittance peak 642B at the same location.

A significant challenge in using a fixed camera 102 for leak detection, as in system 200A, is the occurrence of changes in the background. To address this, in some embodiments, a two-image subtraction method is used. In this method, infrared imaging data is obtained using two different optical filters. For example, in the case of methane detection, in some embodiments, a methane filter and a reference filter are used. The images are subtracted from one another, such as via signal processing performed by processor 326. This results in an enhanced ability to selectively capture leakage of the gas (e.g., methane, etc.) of interest.

Figures 7A, 7B, 7C, 7D:
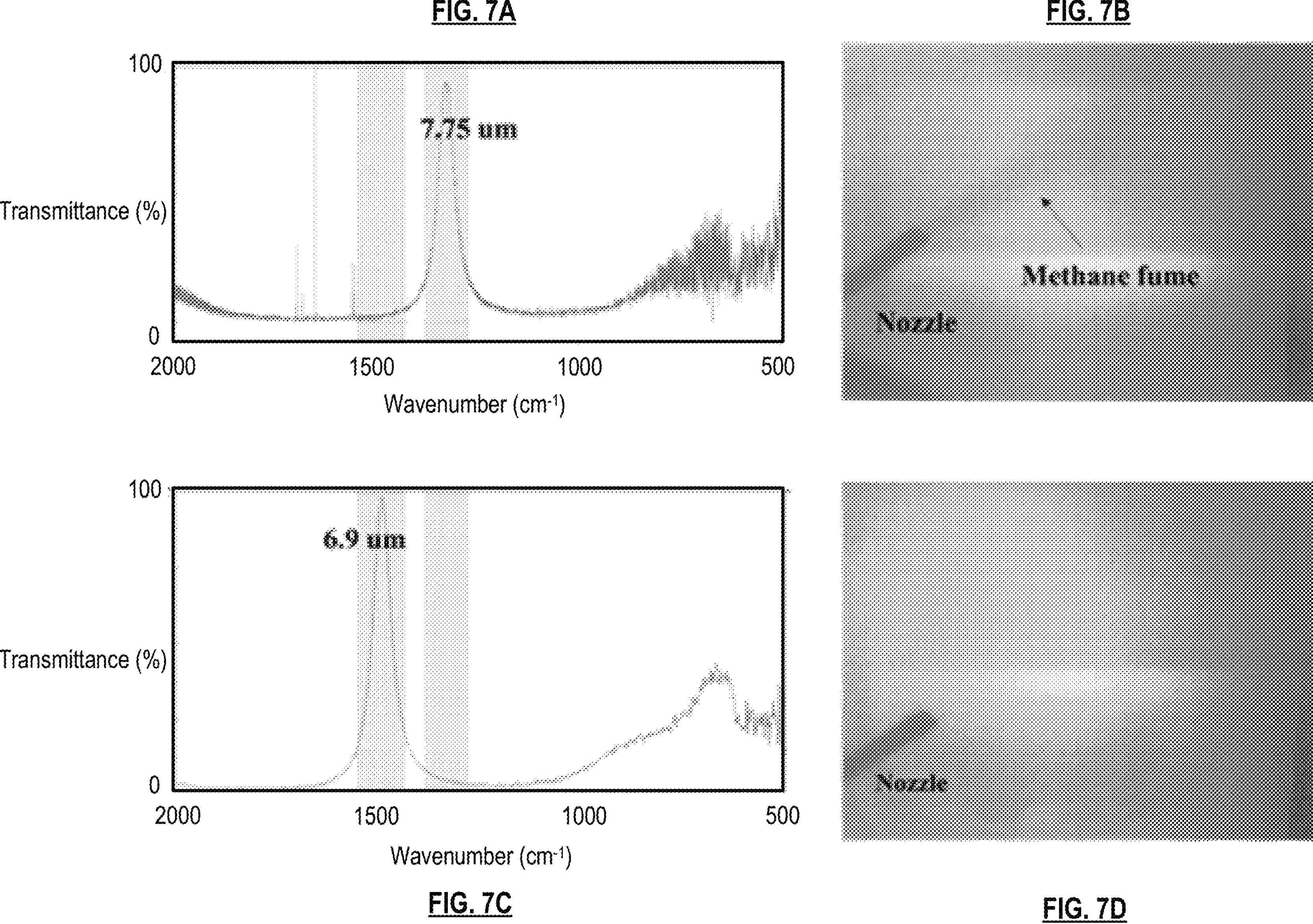
FIGS. 7A-7D depict a first processing method for methane leak detection.

FIG. 7A depicts the transmittance spectrum of a methane filter, with a transmittance peak at 7.75 microns, and FIG. 7B depicts an image captured using the filter. FIG. 7C depicts the transmittance spectrum of a reference filter, as mentioned above, which in this example has a transmittance peak at 6.9 microns, and so captures wavelengths outside the methane-absorption position. FIG. 7D depicts an image captured using the reference filter. The methane fume is visible only in the image captured with the methane filter, not the image taken with the reference filter. This proves useful in determining the authenticity of the methane signal. The two filters can be provided on filter wheel 322 for use with camera 320.

In some embodiments, two-image subtraction is implemented by obtaining a first image using a methane filter and an IR camera, and obtaining a second image with a visible camera. The visible camera can clarity details in the facility, aiding in pin-pointing the exact position of a gas leak. Note that multiple images of each may be obtained to improve S/N.

In some embodiments, a time-resolved imaging method is employed to maximize methane fume contrast by subtracting one frame from a specific time period from the previous frame. In this method, an image from a specific time period is subtracted from a previous frame to highlight any changes, such as a gas leak. In some embodiments, a methane filter is used for time-resolved imaging. Using the filter, the wavelengths associated with methane absorption can be highlighted. This can enhance the contrast between a methane fume and the background. However, the use of the filter reduces the overall brightness of the image. This may be addressed by measuring without the filter; however, the contrast between the methane emission and the background is reduced in the absence of the methane filter. More generally, data acquired from the time-resolved imaging method, with or without a methane filter/IR camera, may be subtracted from data acquired from the time-resolved imaging method, with a reference filter (a filter that absorbs at a wavelength other than methane, etc.)/IR camera, or an image from the visible camera.

Figures 8A, 8B, 8C:
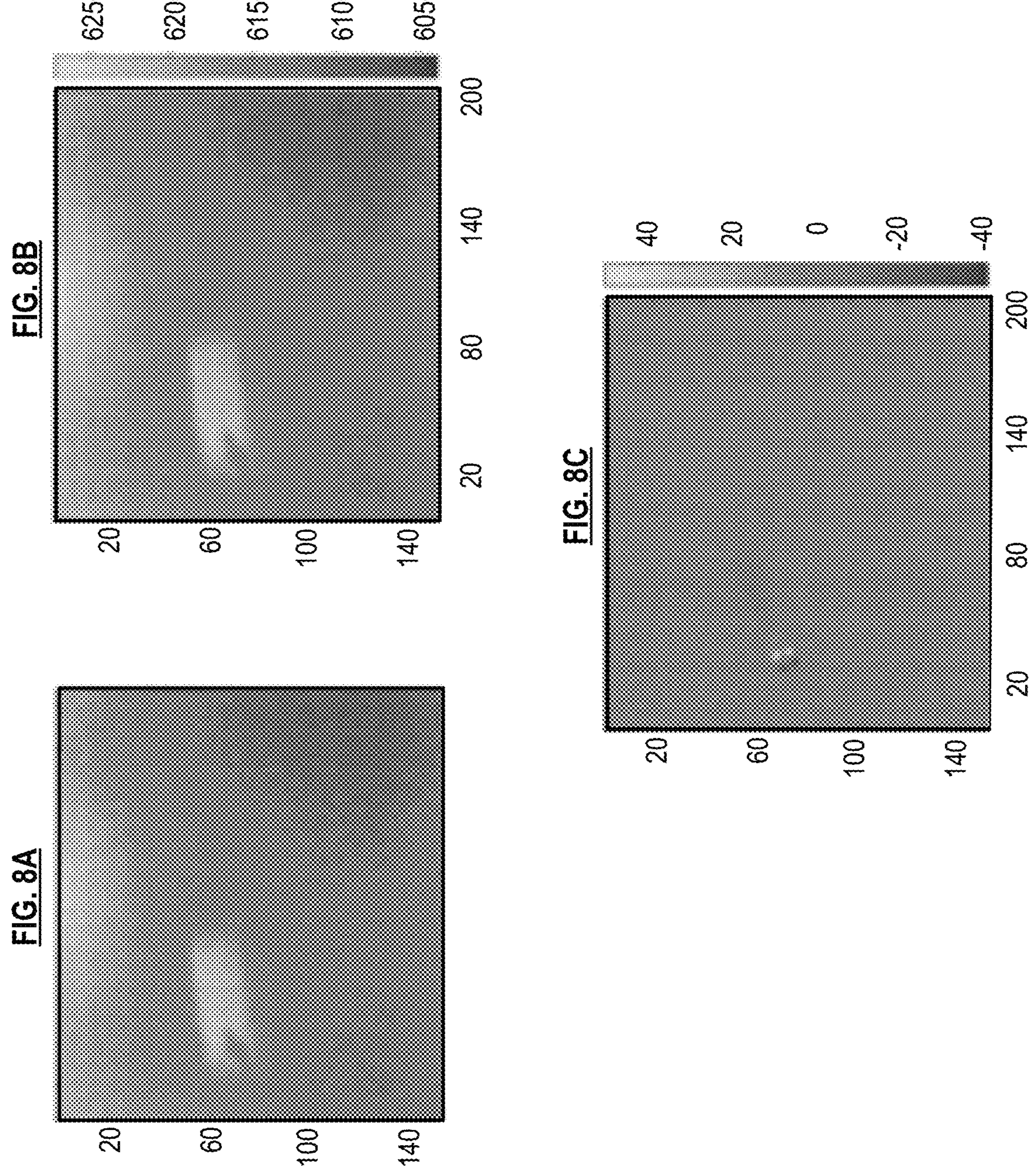
FIGS. 8A-8C depict a second processing method for methane leak detection.

FIG. 8A depicts an image taken before a methane leak occurs, and FIG. 8B depicts an image taken after a methane leak occurs. FIG. 8C depicts the subtraction of the image of FIG. 8B from the image of FIG. 8A, such as performed via process 326, revealing the leakage.

In a further embodiment, by installing different filters with transmittance spectra at various mid-IR wavelengths, a variety of gases, such as other hydrocarbons (e.g., propane, butane, etc.), as well as greenhouse gases, such as nitrous oxide and chlorofluorocarbons among others, can be monitored for leakage. Such filters can be designed and fabricated in accordance with Published Patent Application US2023/0258848, previously referenced.

Figures 9A, 9B:
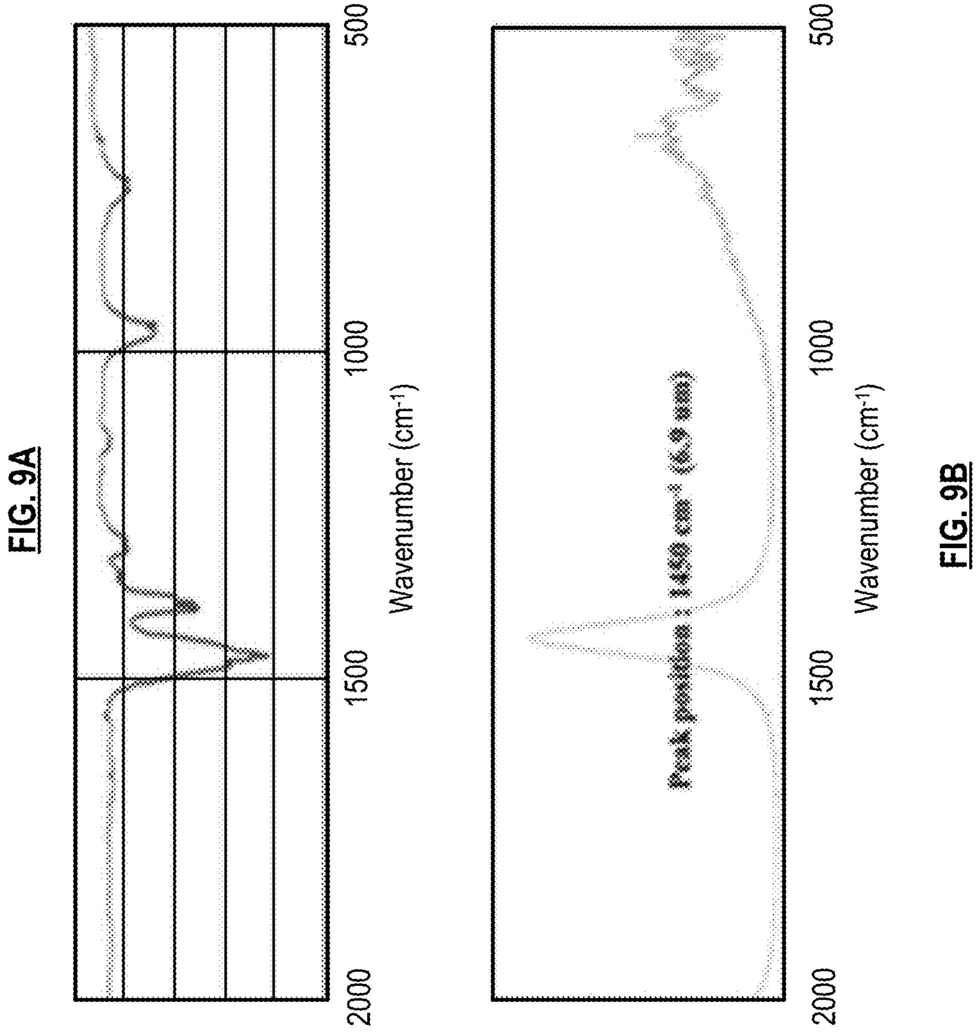
FIG. 9A depicts the infrared transmittance spectrum of butane.
FIG. 9B depicts the performance of an optical filter for butane measurement.

FIG. 9A depicts the transmission spectrum of butane, showing an absorption peak located at a wavenumber of approximately 1430 $cm^{-1}$ (6.9 microns). FIG. 9B depicts the transmission spectrum of a butane filter. By installing such a filter in front of IR camera 320, system 100 is capable of monitoring for a butane leak.

Thus, a plurality of such filters, each for monitoring a different gas, can be provided on filter wheel 322 for use in conjunction with cameras 320.

Consider that, in mobile monitoring system 200B, imaging package 102 can be simplified by dispensing with filter wheel 322 and accompanying motor 324. In such a mobile system, each imaging package 102 can include a single filter. For the two-image subtraction method, for example, a first image can be taken using methane filter 550 via camera 320 associated with a first drone, and a second image can be obtained using the reference filter via camera 320 associated with a second drone. Of course, the drones must be capable of precise and rapid positioning.

It is to be understood that the disclosure describes a few embodiments and that many variations of the invention can easily be devised by those skilled in the art after reading this disclosure and that the scope of the present invention is to be determined by the following claims.

What is claimed:

1. A leak-detection system comprising:

a server; and a plurality of imaging packages, each imaging package including:

an infrared camera having a microbolometer-array;

a filter wheel, the filter wheel including a plurality of different filters, wherein:

(a) a first one of the filters is a methane filter that is selective for a first absorption peak in a range of 7.7 to 7.8 microns wavelength but not for a second absorption peak at 3.3 microns wavelength, the methane filter is therefore transmissive to infrared light at the first absorption peak, and (b) the methane filter comprising: a silicon substrate, a first layer consisting of germanium on the substrate, a second layer consisting of barium fluoride on the first layer, a third layer consisting of germanium on the second layer, a fourth layer consisting of barium fluoride on third layer, and a fifth layer consisting of germanium on the fourth layer;

a motor that is operatively coupled to the filter wheel;

a processor, wherein, the processor is operative:

(a) in conjunction with the motor, to move the filter wheel, thereby sequentially positioning, the methane filter and a second one of the filters of the plurality thereof in front of the infrared camera;

(b) to process the light filtered by the methane filter and the second filter;

(c) to transmit data pertaining to the processed filtered light to the server; and (d) receive data from the server.

2. The leak detection system of claim 1 further comprising a visible camera, wherein the processor processes the filtered infrared light and an image obtained from the visible camera.

3. The leak detection system of claim 2 wherein the processor transmits images obtained from the visible camera to the server.

4. The leak detection system of claim 1 wherein each imaging package of the plurality thereof is coupled to a respective flight-capable drone.

5. The leak detection system of claim 4 wherein each flight-capable drone is programmed to monitor a different location in a facility in which the leak-detection system operates.

6. The leak detection system of claim 4 wherein the server directs at least some of the flight-capable drones to fly to specific locations in a facility in which the leak-detection system operates.

7. The leak detection system of claim 4 wherein:

the server directs a first flight-capable drone to fly to a first location, and directs the infrared camera of the infrared package coupled to the first flight-capable drone to point in a first direction; and the server directs a second flight-capable drone to fly to the first location, and directs the infrared camera of the infrared package coupled to the second flight-capable drone to point in a second direction.

8. The leak detection system of claim 1 wherein the second of the filters is a reference filter, wherein the reference filter is transmissive to light having a different wavelength than 7.7 to 7.8 microns.

9. The leak detection system of claim 8 wherein the processor is operative to subtract an image obtained when the reference filter is positioned in from the infrared camera from an image obtained when the methane filter is in front of the infrared camera.

10. The leak detection system of claim 1 wherein the second filter is a butane filter.

11. The leak detection system of claim 1 wherein the processor is operative to subtract a second image taken at a second time from a first image taken at a first time, wherein the both first image and the second image are obtained by positioning the methane filter in front of the infrared camera.

12. The leak detection system of claim 1 wherein the processor is operative to subtract a second image taken at a second time from a first image taken at a first time, wherein the both first image and the second image are unfiltered by the methane filter or the second filter.

13. A leak-detection system comprising:

a server; and a plurality of imaging packages, each imaging package is coupled to a flight-capable drone, and each imaging package includes:

an infrared camera having a microbolometer-array;

a filter comprising: a silicon substrate, a first layer consisting of germanium on the substrate, a second layer consisting of barium fluoride on the first laver, a third layer consisting of germanium on the second layer, a fourth layer consisting of barium fluoride on third layer, and a fifth layer consisting of germanium on the fourth layer;

a processor, wherein the processor is operative to:

(a) process images obtained from the infrared camera;

(b) transmit data pertaining the processed images to the server; and (c) receive data and instructions from the server.

14. The leak-detection system of claim 13 comprising a visible camera, wherein the processor is operative to process images obtained from the visible camera.

15. The leak-detection system of claim 13 wherein the filter is a methane filter that transmits infrared light having a wavelength in a range of 7.7 to 7.8 microns, corresponding to a first peak of an infrared spectrum of methane, but not substantially transmissive to infrared light having a wavelength of about 3.3 microns, corresponding to a second peak of the infrared spectrum of methane.

* * * * *